UNITED STATES PATENT OFFICE.

YORK ALEXANDER FERDINAND SCHWARTZ, OF LONDON, ENGLAND.

PHOTOGRAPHIC-PRINTING PROCESS AND SOLUTION AND MATERIAL THEREFOR.

1,414,309.  Specification of Letters Patent.  Patented Apr. 25, 1922.

No Drawing.  Application filed September 14, 1921.  Serial No. 500,667.

*To all whom it may concern:*

Be it known that I, YORK ALEXANDER FERDINAND SCHWARTZ, a citizen of the German Republic, residing in London, in the county of Middlesex and Kingdom of England, have invented certain new and useful Improvements in Photographic - Printing Processes and Solutions and Materials Therefor, (for which I have filed an application in England, No. 24,208, dated August 20, 1920,) of which the following is a specification.

This invention relates to improved photographic printing papers and the like sensitized materials and processes of producing and treating the same.

In my United States Patent No. 710,019 dated Sept. 30, 1902, reissued No. 13,144 dated Aug. 16, 1910 and again reissued No. 13,162 dated Oct. 25, 1910 and No. 962,788 dated June 28, 1910, I described photographic emulsion containing silver phosphate in the insoluble form. According to my present invention I employ silver phosphate in dissolved form, and such a solution is preferably prepared by treating silver phosphate with ferric oxalate though other compounds can be used as hereafter described. Photographic material such as paper may be sensitized by the use of such a solution which may be developed by the alkali salt of an organic acid.

Such solutions of silver phosphate may be prepared by treating either the ortho-phosphate, meta-phosphate or pyro-phosphate of silver, especially when freshly prepared with a sufficient quantity of ferric salts of organic acids, more particularly ferric oxalate or citrate which must be free from the corresponding ferrous salts. The ortho-phosphate readily dissolves in a solution of such salt at ordinary temperature, but the pyro-phosphate and meta-phosphate require to be heated to about 50 to 60° C. Possibly the pyro or meta-salts are converted into the ortho-phosphate prior to or during solution. In any case the solutions so obtained appear to represent either true or colloidal solutions of silver phosphate and will be hereafter described as solutions.

It may be added that it is not necessary to isolate the silver phosphate, but that products of reaction between silver nitrate and an alkali phosphate may be used as hereafter described, preferably with the addition of a certain quantity of an organic acid, and in practice it is not necessary to remove the soluble sodium or other nitrate produced by double decomposition.

The silver phosphate preferably in the freshly prepared form, e. g. the product of double decomposition above described, is then treated with a solution of the ferric salt of an organic acid, preferably ferric oxalate which appears to be the most satisfactory, when a solution is obtained which is found to be capable of preservation in the dark for prolonged periods while still remaining photographically perfect.

Such solutions under whatever conditions they may have been prepared appear always to possess the same speed and gradation and to produce the same tone provided the nature and the proportions of the components are unchanged.

The sensitizing solution so obtained may be treated to increase its viscosity, e. g. by mixing the finished solution with suitable colloids such as solutions of gelatine, gum acacia or the like, but these colloids must not be added during the process of preparing the silver phosphate. Albumen must not be mixed with the solution as it is coagulated thereby, and if it is necessary to employ albumen in the manufacture of the paper or the like, the materials to be sensitized must be coated first with plain albumen and dried before sensitizing by the solution.

The solution can be applied by floating, spraying, brushing on, rolling on, immersion or the like, and any suitable material may be employed, e. g. paper, fabric or glass, the latter after having been coated with some insoluble material, e. g. hardened gelatine, which will absorb the solution which is then dried when it is ready to be exposed behind a negative drawing, stencilled design, or any other device, producing a developable image by actinic radiation. The materials could be used in a camera if desired but the exposure would have to be extremely long.

After exposure, the print is developed by treatment with an alkali salt of an organic acid preferably the alkali salt of the acid present in the ferric salt. It will be found that even when the print has only been exposed for a short time, excellent development will be obtained and the results are extraordinarily perfect.

The invention is described in the specification in such manner that it can be performed independent of any theory as to the action of the reagents, but I may state that as far as I am aware the following reaction takes place, though it will be understood that the invention is not limited to the particular theory expounded, although this is believed to be accurate. It appears that when sensitized material prepared from the above solution is exposed to actinic light, two different photochemical actions are produced, viz. the ferric salt is reduced to ferrous salt in proportion to the amount of light received and the silver phosphate, which possesses all the properties required for the production of a perfect image, is at the same time affected also in proportion to the amount of light received. Now when the reaction has taken place, the ferrous compound produced will act as a developer for the silver compound in presence of the alkali salts of the organic acid, and it will be seen that the amount of the developer is automatically proportionate to the amount of exposure which has taken place, so that according to the present invention, the development is extremely successful.

I will now illustrate the invention more clearly by the following examples; the operation should be carried out in yellow light or taking other precautions to exclude actinic light.

*Example A.*

Sensitizer without colloids:

(1) Place 36 grammes of ferric oxalate (scales) free from ferrous salt in a suitable vessel, add 100 cc. of distilled water, stand the whole in a boiling water bath, and, stirring or shaking from the start leave it there till all has dissolved. Remove from water bath, let cool to ordinary temperature and filter through pure paper.

(2) Into a glazed porcelain or earthenware dish (mortar) place—

4.8 gr. silver nitrate.

2.8 gr. sodium phosphate ($Na_2HPO_4.12H_2O$).

70.0 cc. distilled water of ordinary temperature, rub up with pestle until the salts have dissolved, and the yellow silver phosphate has settled out.

Then add to the contents of the dish, 70.0 cc. of the ferric oxalate solution (1) at ordinary temperature and rub up with pestle till the silver phosphate has dissolved, add (3) 3.0 gr. of citric acid (powdered crystals, free from lead) rub up till the citric acid has dissolved, filter through pure paper. Preserve in glass-stoppered bottles of deep yellow glass in the dark.

*Example B.*

Sensitizer with a colloid (gelatine). If an addition e. g. of gelatine be required, proceed as follows:

Make up the filtered sensitizer exactly as described above, but instead of the 70 cc. of distilled water prescribed for preparing the silver phosphate (No. 2 of Example A), use only 30 cc. In the 40 cc. of distilled water remaining, soak and afterwards dissolve, at about 30 to 40° C., the desired amount, say 4 gr. of medium photographic gelatine, add the filtered sensitizer to the warm gelatine solution, agitating well during addition, and finally filter the mixture through absorbent cotton or other suitable material. The concentration of the gelatine sensitizer will then be exactly the same, as that of the sensitizer without gelatine described above.

This gelatine sensitizer remains liquid at temperatures above 10° C. It is evident that sensitizers with any other suitable colloid may be prepared by simply substituting such colloid for the gelatine of the above example.

I declare that what I claim is:—

1. A photographic solution containing silver phosphate and a compound adapted to yield a developer under the action of light.

2. A photographic solution containing silver phosphate and the ferric salt of an organic acid.

3. Photographic sheet material sensitized by silver phosphate and the ferric salt of an organic acid.

4. The process of preparing a photographic solution which consists in dissolving freshly precipitated silver phosphate in a solution of the ferric salt of an organic acid.

5. The process of preparing a photographic solution which consists in dissolving silver phosphate by the aid of the ferric salt of an organic acid.

6. The process of sensitizing a photographic material which consists in precipitating silver phosphate dissolving the freshly precipitated phosphate and apply the solution to the material.

7. The process of sensitizing photographic material which comprises preparing a solution containing silver phosphate and a body adapted to yield a developer on exposure.

8. A photographic solution containing silver phosphate and ferric oxalate.

9. A photographic solution containing silver phosphate, the ferric salt of an organic acid and an excess of an organic acid.

10. The process of obtaining photographic images which comprises senitizing a surface with a solution containing silver phosphate and the ferric salt of an organic acid, exposing the same to actinic light and developing with a solution of an alkali salt of an organic acid.

In witness whereof, I have hereunto signed my name this 25th day of August, 1921, in the presence of two subscribing witnesses.

YORK ALEXANDER FERDINAND SCHWARTZ.

Witnesses:
ERNEST HENRY ROBERTS,
GEORGE PERCY SKELDEY.